Figure 1:
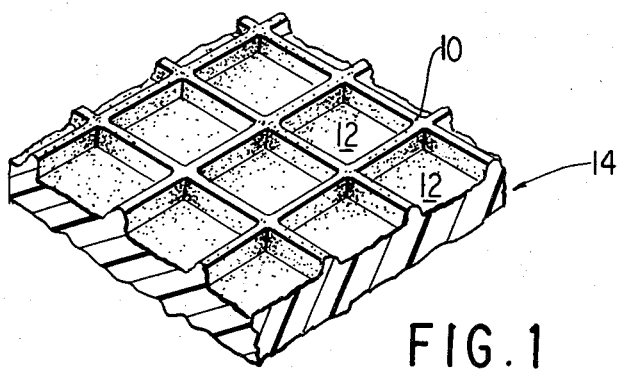

Feb. 20, 1968     S. D. BLUE     3,370,117

CRUSHED POLYURETHANE FOAM AND METHOD OF MAKING SAME

Filed Sept. 16, 1965

INVENTOR
SIDNEY D. BLUE
BY
ATTORNEY

United States Patent Office 3,370,117
Patented Feb. 20, 1968

3,370,117
CRUSHED POLYURETHANE FOAM AND METHOD
OF MAKING SAME
Sidney D. Blue, New York, N.Y., assignor to Reeves
Brothers, Inc., New York, N.Y., a corporation of New
York
Continuation-in-part of application Ser. No. 256,703,
Feb. 6, 1963. This application Sept. 16, 1965, Ser. No.
487,788
4 Claims. (Cl. 264—321)

This invention relates to a process for making a new polyurethane foamed product and, more specifically, it relates to a thin sheet of flexible polyurethane foam in which the cells have been crushed to foam a highly drapeable product for use in the textile field.

This is a continuation-in-part of my earlier application, Ser. No. 256,703, filed Feb. 6, 1963 and now abandoned.

In recent years, woven and knitted materials have been increasingly using a thin sheet of polyurethane foam adhered thereto. The foam, due to its relatively chemical inert nature and its elasticity, provides a dimensional stabilizer for the knitted materials or loose woven ones while adding crease resistance and considerable thermal insulation. Laminates of this kind have sold something in excess of 100,000,000 linear yards in the past few years and have become a very popular item in the outerwear field. Due to this popularity, such laminates have sometimes been used for garments where the relative bulkiness of the cloth-foam makes some of the features of the garments undesirable. For instance, in thin fabrics laminated to foam a rather roundish or balloonish appearance occurs at a turned over sewn edge. As this appearance is in great contrast to the appearance of such garments when made of conventional materials, it is easily noticed and causes some customer resistance.

Laminates that appear generally have a thickness of foam of approximately $\frac{1}{16}$ inch. This is equal to or greater than the thickness of the cloth to which it is adhered. Thus, there are limitations as to where the laminates may be used.

The relative thickness of the foam to that of the fabric may cause the resultant laminate to have relatively poor draping characteristics, that is, the ability to easily fall upon being draped over an object. The large section modulus of the bulky foam appears to be the reason for this poor drapeability. If this problem could be overcome, there are a large number of relatively thin fabrics which could be used if there was a backing material which would maintain the dimensional stability of the fabric while adding something in the way of insulative value.

Polyurethane foam of the flexible type, such as is conventionally used in apparel laminations, is almost predominately of the polyester type and is characterized by having a thickness of $\frac{1}{16}$ inch to $\frac{3}{8}$ inch, has open cells, is not thermoplastic, has a density in the range of about 1.6 to 2.1 pounds per cubic foot, and comes in long rolls. It is usually made by reacting an organic polyester with a polyisocyanate into relatively large blocks which are then sliced longitudinally or turned down on a peeler in much the same manner as a lathe, to produce the long thin sheets.

Polyurethane foams of the polyester type are cross-linked polymers and as such do not have a true or reversible melting point. Accordingly, foams made from such cross-linked polymers begin to decompose at temperatures below the temperature at which the polymer will actually flow in a liquid manner. Thus, herein the "melting temperature" is the one where the polymer so flows.

One of the principal advantages of polyurethane foam for use in apparel is its relatively chemical inertness and high "melting" temperature whereby it will withstand washing and dry cleaning while maintaining its dimensional stability.

Keeping in mind all of the desirable features of the polyurethane foam as well as the desirability of having a material which is more readily drapeable, the present invention provides a thin sheet of macrocellular polyurethane foam in which a predominate number of the cell walls have been permanently crushed to yield a density between 5 and 11.5 pounds per cubic foot.

The invention also contemplates a process for making such crushed foam where the crushing is done between contrarotating rolls in the temperature range of 50° to 100° F. below the "melting" point of such polyurethane during which time the original thickness is permanently reduced by at least 65 percent, and up to 80 percent.

The invention also contemplates a polyurethane sheet adapted for lamination in which one face of the foam has an embossing which is characterized by a repeating pattern of raised portions and depressions. Moreover, the invention provides for making such embossed foam by compressing foam between a pair of opposed pressure rolls at least one of which is heated and contains embossing thereon.

The various features of novelty which characterize the invention are pointed out with particularity in the claims annexed to and forming a part of this specification, but for a better understanding of the invention, its operating advantages and specific objects obtained by its use, reference should be had to the detailed explanations of the preferred embodiments of the invention along with the illustrations in the accompanying drawings.

Figure 3:
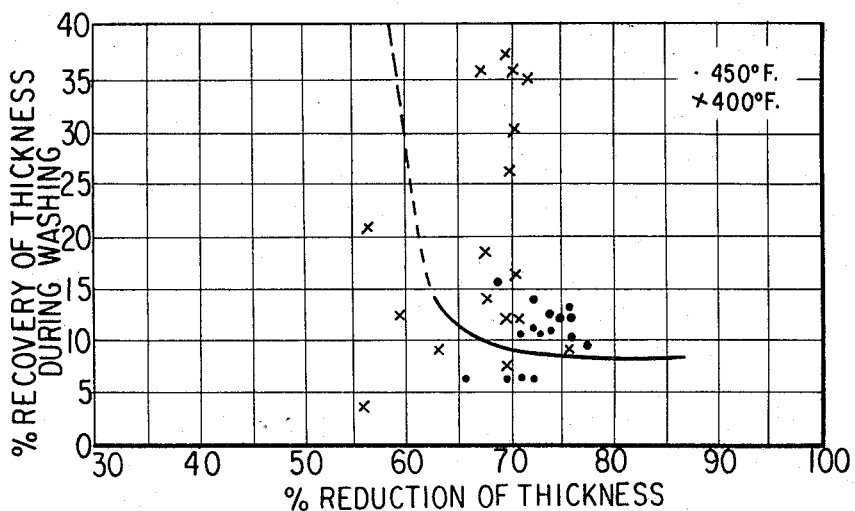
Figure 2:
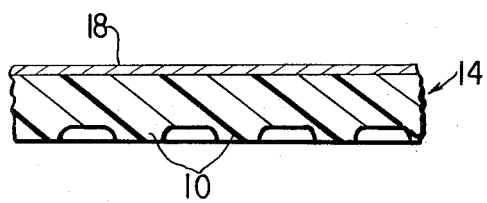

In the drawings:
FIGURE 1 is an isometric view showing the product of the invention;
FIGURE 2 is a section through a textile lamination showing the application of the product; and
FIGURE 3 is a curve showing the critical relationship between the amount of thickness reduction during crushing to the residual recovery during washing.

Polyurethane foam in a long sheet having a thickness of about $\frac{3}{32}$ inch is passed between the rolls of a calendering machine in which there are opposing rolls causing the foam to be compressed during its passage therethrough. One of the rolls should be heated and maintained at a temperature in a range of 50° F. to 100° F. below the melting point of such foam and preferably about 60° F. below the melting point and should be running at speeds of approximately 175 to 250 yards per hour under high pressure, in the order of four tons, to provide a reduction in thickness from the original of at least 65 percent. It has been found, as will be more fully described hereafter, that unless the foam is subjected to a compression in the above-mentioned temperature range which will result in a reduction of thickness from the original by at least 65 percent, upon subsequent washing and dry cleaning, it will recover back a substantial portion of its original thickness and thus not be satisfactory for many of the uses intended. More specifically we have found that the continuous processing of the foam sheet is more uniformly done if there is imposed on the foam as it passes through the rolls a greater pressure at spaced longitudinal and lateral points than in between such points. The most desirable way to apply such pressure points is to provide the heated roll of the calender with a surface engraved in a repeating pattern, for example, a fine mesh or screen with grooves approximately .010 inch deep and .020 inch wide, with them being spaced apart approximately .020 inch. The grooves are engraved circumferentially and longitudinally on the roll so as to form a mesh design with approximately twenty-five squares per inch in both directions or approximately six hundred twenty-five (625) squares per inch.

Alternately, the engraving can be on the unheated roll and have various forms, but nevertheless, must have pressure producing points at spaced circumferential and lateral portions in any repeatable pattern.

The thin flexible foam, when passed between a heated engraved roller and the second buffer roller, produces foam having the general configuration of FIGURE 1 in which there are raised portions 10 arranged in a general lattice work having depressions 12 to yield a face having embossing characterized by a repeatable pattern of raised portions 10 and depressions 12. This yields a foam 14 which has a "density" greater than five (5) pounds per cubic foot. Such "density" is determined by multiplying the original density by the ratio of the original thickness to that of the crushed foam thickness. All measurements of embossed foam thickness are taken from the top of the raised portions 10 to the bottom of foam 14 after it has been reduced at least 65 percent. Thus, the final "density" is always about three to four times the original density for products made according to the present invention.

Alternatively, the regular thin polyurethane foam sheet may be crushed to at least 65 percent of its original thickness by passing it between the smooth rolls of a calender with at least one of the rolls heated in the range of 50° F. to 100° F. below the melting point of the foam and where there is interposed between one of the rolls and the foam an open mesh woven material known in the trade as "scrim." The scrim serves as a carrier to provide the spaced longitudinal and lateral pressure point to thus cause the foam to flow uniformly between the rolls. Without such scrim or without embossing on the rolls, it was found that, particularly the thicker foams would tend to bunch up and go through with creases. It is believed that this is due to the friction characteristics of the foam. In crushing with some widely spaced scrim, the foam becomes embossed in much the same manner as is produced by an engraved roller.

The invention also contemplates an embossed foam 14 of the type illustrated in FIGURE 1 laminated to a textile material 18, as shown in FIGURE 2. We have found that the crushed foam, in accordance with the process herein and laminated to a textile or other second material, produces a textile having vastly improved flexibility and drapeability.

Experiments have shown that the amount of crushing which must be done on the polyurethane foam has a definite relationship to its thickness stability so that it is necessary to reduce the original thickness by at least approximately 65 percent by crushing in the temperature range of 50° F. to 100° F. below the melting temperature of the polyurethane.

To give a better understanding of the criticality of the crushing and the temperature requirements, please refer to the following table in which the test data from a number of samples appears.

VARIATION OF TEMPERATURE AND THICKNESS AGAINST RECOVERY

| Sample Number | Roll Temp., °F. | Fusion Temp., °F. | Orig. Density, lbs./cu. foot | Orig. Thickness, mils | Crushed Foam Thickness, mils | Percent Reduction | Crushed Density, lbs./cu. foot | Thickness After Washing, mils | Percent Recovery | Acceptable |
|---|---|---|---|---|---|---|---|---|---|---|
| 1 | 450 | 510 | 1.54 | 101 | 28 | 72.3 | 5.55 | 32 | 14.3 | Yes. |
| 2 | 450 | 510 | 1.54 | 99 | 30 | 69.7 | 5.08 | 32 | 6.7 | Yes. |
| 3 | 450 | 510 | 1.54 | 99 | 29 | 70.7 | 5.26 | 32 | 10.3 | Yes. |
| 4 | 450 | 510 | 1.54 | 99 | 27 | 72.8 | 5.65 | 30 | 11.1 | Yes. |
| 5 | 450 | 510 | 1.58 | 131 | 31 | 76.4 | 6.69 | 35 | 12.9 | Yes. |
| 6 | 450 | 510 | 1.58 | 128 | 30 | 76.5 | 6.75 | 33 | 10.0 | Yes. |
| 7 | 450 | 510 | 1.58 | 129 | 31 | 69.7 | 6.58 | 34 | 9.7 | Yes. |
| 8 | 450 | 510 | 1.58 | 127 | 30 | 76.3 | 6.70 | 34 | 13.3 | Yes. |
| 9 | 450 | 510 | 1.93 | 101 | 29 | 71.2 | 6.72 | 31 | 6.9 | Yes. |
| 10 | 450 | 510 | 1.93 | 107 | 28 | 73.9 | 7.37 | 31 | 10.7 | Yes. |
| 11 | 450 | 510 | 1.93 | 103 | 29 | 71.8 | 6.86 | 31 | 6.9 | Yes. |
| 12 | 450 | 510 | 1.93 | 106 | 28 | 73.6 | 7.31 | 31 | 10.7 | Yes. |
| 13 | 450 | 510 | 1.80 | 132 | 31 | 76.5 | 7.66 | 34 | 9.7 | Yes. |
| 14 | 450 | 510 | 1.80 | 129 | 32 | 75.1 | 7.25 | 33 | 3.1 | Yes. |
| 15 | 450 | 510 | 1.80 | 126 | 31 | 75.3 | 7.31 | 35 | 12.9 | Yes. |
| 16 | 450 | 510 | 1.80 | 123 | 32 | 74.0 | 6.92 | 36 | 12.5 | Yes. |
| 21 | 400 | 510 | 1.54 | 101 | 40 | 60.3 | 3.89 | 47 | 17.5 | No. |
| 22 | 400 | 510 | 1.54 | 100 | 41 | 59.0 | 3.76 | 46 | 12.2 | No. |
| 23 | 400 | 510 | 1.54 | 100 | 43 | 57.0 | 3.58 | 44 | 2.3 | No. |
| 24 | 400 | 510 | 1.54 | 101 | 43 | 57.4 | 3.62 | 52 | 20.9 | No. |
| 25 | 400 | 510 | 1.58 | 125 | 38 | 69.5 | 5.20 | 52 | 36.8 | No. |
| 26 | 400 | 510 | 1.58 | 127 | 42 | 66.9 | 4.78 | 57 | 35.8 | No. |
| 27 | 400 | 510 | 1.58 | 132 | 38 | 71.2 | 5.49 | 57 | 50.0 | No. |
| 28 | 400 | 510 | 1.58 | 129 | 40 | 69.0 | 5.10 | 55 | 37.5 | No. |
| 29 | 400 | 510 | 1.93 | 103 | 36 | 65.0 | 5.52 | 40 | 11.1 | Yes. |
| 30 | 400 | 510 | 1.93 | 96 | 35 | 63.5 | 5.29 | 38 | 8.6 | Yes. |
| 31 | 400 | 510 | 1.93 | 100 | 33 | 67.0 | 5.85 | 39 | 18.2 | Yes. |
| 32 | 400 | 510 | 1.93 | 105 | 34 | 67.6 | 5.96 | 39 | 14.7 | Yes. |
| 33 | 400 | 510 | 1.80 | 132 | 40 | 69.6 | 5.93 | 43 | 7.5 | Yes. |
| 34 | 400 | 510 | 1.80 | 129 | 37 | 71.2 | 6.28 | 42 | 13.5 | Yes. |
| 35 | 400 | 510 | 1.80 | 125 | 36 | 71.2 | 6.26 | 42 | 16.6 | Yes. |
| 36 | 400 | 510 | 1.80 | 121 | 37 | 69.3 | 5.89 | 42 | 13.5 | Yes. |

The foam processed for the above data was of the polyester type as aforesaid and was crushed by having its original thickness reduced between 57.0 and 76.5 percent when measured between the bottom of the foam and the maximum top projection from the foam. It can be seen that this yielded densities between 3.58 and 7.66 pounds per cubic foot for a range of foam densities of 1.54 to 1.93 pounds per cubic foot, but the most significant data is that in the last two columns of the table which report the percent of thickness recovery during the washing and whether or not the sample is acceptable for apparel textile use. This particular percentage and the resultant densities are calculated based on the thickness which resulted from the crushing and can be determined by taking the thickness after crushing (measured from the top of any raised portions) and subtracting it from the thickness after dry cleaning or washing and dividing it by the thickness after crushing.

The significant data of percent reduction versus percent recovery during washing is presented in FIGURE 3 wherein the data is plotted to show that there is a critical break in the curve at approximately 65 percent reduction of thickness. As the polyurethane is chemically complex, one must note that there is the normal scatter of data, but it is very evident that permanent crushing only comes from the combination of the proper temperature and amount of crushing. This illustrates that reductions of thickness less than 65 percent at temperatures less than 100° F. below the melting point, results in a dimensionally unstable product, whereas any crushing beyond that of temperatures between 100° F. to 50° F. below the melting point, results in a product having a nominal recovery which is essentially constant. Converting the break point in the curve to "density," yields a critical point of about 5.3 pounds per cubic foot. Thus, considering that flexible urethane foams for lamination have densities in the range of 1.6 to 2.1 pounds per cubic foot, the minimum density for a crushed foam is about 5.0 pounds per cubic foot which is about three times its original density, and the maximum is about 11.5. The tests also reveal that thickness reductions in excess of 80 percent require more work than is justified for ordinary apparel textile applications.

A microscopic examination of the crushed foam shows that a considerable portion of the membrane of the cell walls has been crushed and remains so even after the dry cleaning and washing. Where the foam passes through an engraved roller, the depressed areas show a greater degree of cell wall collapse than the raised portions and in all cases the cell walls which are permanently crushed predominate over those which have not been crushed. Thus, it is a characteristic of the foam of the invention that most of the cell walls have been permanently crushed.

It should also be appreciated that the standard tests for determining resistance to dry cleaning and washing are to subject the samples of the urethane foam, after crushing, to two standard washing cycles or, in the alternative, two standard dry cleaning cycles in commercial equipment. We have also found that the result on the urethane is substantially the same if the urethane is subjected to a steam atmosphere of 220° for approximately three (3) hours. All of the above may be referred to generally in the data tables as washing for purposes of reporting data.

In addition to the above data, the crushed foam samples were measured for their ability to drape. This test measures the ability of the foam to bend under its own weight and is done by taking a 1 inch wide piece of foam 10 inches long and looping it to form a horizontally oriented cylinder. After one minute in that attitude, the width of the loop is measured in the plane of the axis of the loop. Regular ³⁄₃₂ inch thickness foam has a drape of 2.7 inches, whereas the samples made according to the present invention had a drape of at least 3.7 inches (an increase of 37%).

It is important to note that all of the test data came from foam samples made from foam of the polyester type. Present formulations of polyether polyurethane do not permanently crush by the method herein cited. Accordingly, the words "polyurethane of the polyester type" are intended to mean any polyurethanes which will crush under the conditions specified and claimed herein, irrespective of the chemical classification of the foam. The statement is based on the inventor's understanding that the classification of polyester and polyether are not completely definitive of all properties of the urethane foams. It is his belief that the ability of the urethane foam to take a permanent set upon the application of heat and pressure, controls on whether a particular formulation of urethane will or will not operate within the scope of this disclosure and claims. Foamed urethanes of the polyester type are known to have melting temperatures varying between 450° F. and 565° F., depending upon the formulation used to make them. Accordingly, the temperatures specified herein to be used when performing the process of the invention, may be required to be adjusted to accommodate the different fusion temperatures of such foams. The important factor is that the foam must be initially compressed at a temperature where it will be reduced to at least 65 percent of its original thickness and yet at a temperature where the foam does not lose its desirable cellular characteristic. Further, urethanes are known to not have a fixed melting temperature, but have a temperature range of 50 to 130 degrees below the fusion temperature in which some of the constituents volatilize, such temperature range is generally referred to as the "discoloration range" because the foam changes color when subjected to temperatures in that range. One practicing the process of the present invention with foams of varying formulations and therefore varying fusion temperatures, must operate his hot pressure roll at a temperature sufficiently below the fusion temperature to prevent the rolls from becoming clogged with vaporized urethane products and this is about 50° F. below the melting temperature. Thus, the operating temperature for carrying out the process can be no higher than the temperature which is below the range at which decomposition of the urethanes occurs and 60° F. below the fusion temperature is suggested.

From the above description, it can be seen that the invention preserves all of the desirable characteristics of urethane foams while reducing them considerably in bulk and adding substantially to the drapeability.

Since most of the foam used in the market today is for lamination, it is essential that the foam have special characteristics which insure a good bond with a minimum of loss of foam during lamination while increasing the flexibility characteristics of the resultant laminate. The embossing character of the foam, whether it be crushed or not, assures this.

The flexible foam sheets produced by the above process show, when compared with uncrushed foam having the normal use in textiles, greater tensile strength, greater elastic recovery and greater drapeability. As such, this product will find many uses where such strength and drape characteristics are needed than would be the case with the present day bulkier foam.

The method proposed herein can be done continuously in long rolls and thus is adapted for mass production methods which are compatible with the general requirements of the apparel industry.

While the present invention is illustrated with respect to thinner foams, such as the type found in the apparel industry, it is contemplated that it is applicable to thicker foams so as to be able to get heavy, stronger membranes for uses in other applications. The thicker foams will require a lower running speed due to the necessity to heat the entire thickness of the foam in a temperature range of 50° F. to 100° F. below the melting temperature of the foam so as to obtain the predominate amount of crushed cells necessary to achieve a crushed foam of standard dimensions.

While in accordance with the provisions of the statutes there has been illustrated and described herein a specific form of the invention now known, those skilled in the art will understand that changes may be made in the form of the product or the method of making it disclosed without departing from the spirit of the invention covered by the claims and that certain features of the invention may sometimes be used to advantage without a corresponding use of other features.

What is claimed is:

1. A process for manufacturing cellular polyurethane comprising compressing a thin sheet of flexible foamed polyurethane of the polyester type between contra-rotating rolls in which at least one of said rolls is heated to a temperature in the range of 50° F. to 100° F. below the melting point of such pollyurethane to permanently crush a substantial part of the cell walls and reduce the original thickness by at least 65 percent.

2. A process according to claim 1 in which the original thickness is reduced by between 65 and 80 percent.

3. A process according to claim 1 in which the thin sheet of flexible foamed polyurethane is passed between said rolls by applying thereto greater pressure at spaced longitudinal and lateral points than in between such points to provide on such foam a repeating pattern in which there are raised and depressed portions.

4. A process according to claim 2 in which said sheet of foam is fed between said rolls uniformly by imposing a greater crushing pressure on the foam at spaced longitudinal and lateral points on said foam than in between such points to cause the foam to be positively carried through said opposing rotating rolls.

(References on following page)

References Cited

UNITED STATES PATENTS

| | | | |
|---|---|---|---|
| 2,076,122 | 4/1937 | Duryee | 161—123 |
| 2,878,153 | 3/1959 | Hacklander | 161 |
| 3,012,926 | 12/1961 | Wintermute et al. | 156—199 |
| 3,070,476 | 12/1962 | Miller | 161 |
| 3,085,896 | 4/1963 | Britt et al. | 161 |
| 2,865,046 | 12/1958 | Bird | 161—40 X |
| 3,328,505 | 6/1967 | Spencer | 264—321 |

FOREIGN PATENTS 599,493    6/1960    Canada.

M. SUSSMAN, *Primary Examiner.*

EARL M. BERGERT, *Examiner.*